F. A. COSTELLO.
ELECTRIC SOLDERING DEVICE.
APPLICATION FILED OCT. 2, 1918.
1,304,545.
Patented May 27, 1919.
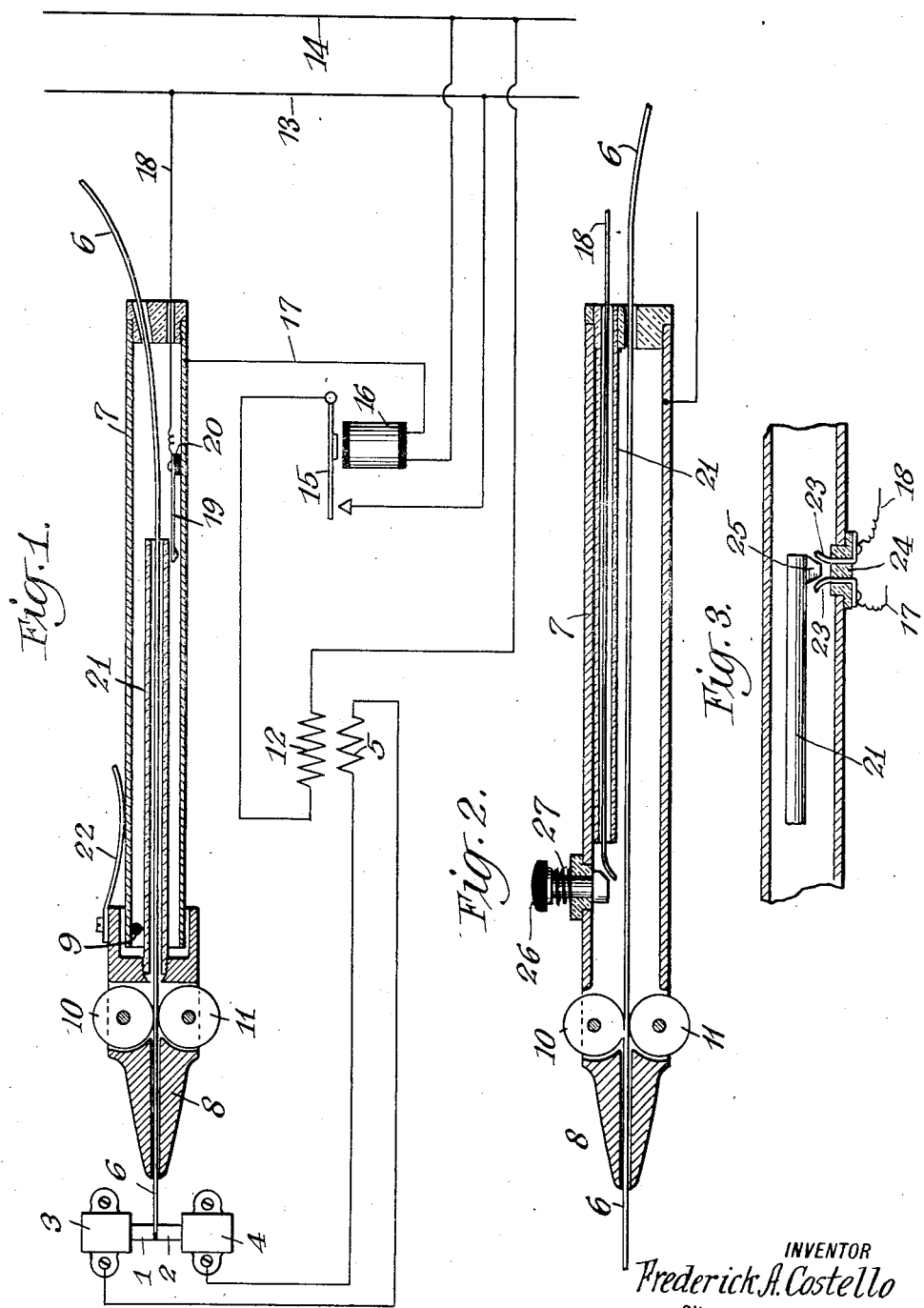
INVENTOR
Frederick A. Costello
BY
Townsend & Decker
ATTORNEYS

UNITED STATES PATENT OFFICE.

FREDERICK A. COSTELLO, OF SOUTHBRIDGE, MASSACHUSETTS, ASSIGNOR TO THOMSON ELECTRIC WELDING COMPANY, OF LYNN, MASSACHUSETTS, A CORPORATION OF MASSACHUSETTS.

ELECTRIC SOLDERING DEVICE.

1,304,545.   Specification of Letters Patent.   Patented May 27, 1919.

Application filed October 2, 1918. Serial No. 256,498.

*To all whom it may concern:*

Be it known that I, FREDERICK A. COSTELLO, a citizen of the United States, and a resident of Southbridge, in the county of Worcester and State of Mass., have invented certain new and useful Improvements in Electric Soldering Devices, of which the following is a specification.

My present invention relates to improvements in electric soldering devices and has for its object to provide a simple, compact device whereby parts of small articles such as jewelry, eyeglass frames, &c., may be united by solder in a quick, neat and economical manner.

In carrying out the invention I preferably provide a tubular holder somewhat resembling a pencil or pen holder by which the solder is applied to the work to be united and which holder also carries the circuit controlling devices for controlling the flow of current used in heating the solder whereby the electric energy is only used in heating the solder when the same is in contact with the work to be united.

The invention consists in the improved electric soldering device hereinafter more particularly described and then specified in the claims.

In the accompanying drawings, Figure 1 is a longitudinal cross-section through a soldering device constructed in accordance with one form of this invention, the figure also diagrammatically illustrating the electric heating circuit.

Fig. 2 is a longitudinal cross-section through a modified form of tool.

Fig. 3 is a fragmentary view illustrating a further modification in the form of circuit controlling means which may be employed.

In the drawings, 1 and 2 indicate the parts to be united. They are held in suitable clamps 3, 4, said clamps being electrically connected with the terminals of a step down transformer secondary 5.

6 indicates the fusing material in the form of a wire solder of any desired length and which is used to unite the parts 1 and 2.

Referring to Fig. 1, 7 indicates a tubular holder preferably of brass and provided at one end with a head 8 pivoted thereto as at 9, a sufficient amount of clearance being provided between the head and the tube to permit the head to rock with relation to the tube. The wire solder 6 passes longitudinally through said holder and head 8 and is fed therethrough as desired by suitable feed rolls 10, 11 having knurled peripheries or in any other suitable manner.

The primary 12 of the transformer is connected to the feed wires 13, 14 through the armature 15 of a relay coil 16.

The relay coil is connected across the feed wires 13, 14 and in series therewith is a circuit controller carried by the holder 7 and which may be of any suitable construction. Said circuit controller or switch controls the flow of current through the relay and thereby controls the circuit through the primary 12 of the transformer in a manner readily understood by an inspection of the diagram Fig. 1. Controlling the primary circuit of the transformer also controls the flow of current through the secondary and through the work pieces 1 and 2.

According to one way of controlling the circuit the wire 17 from the relay coil 16 may connect direct with the conducting shell of the holder 7. A wire 18 from the feed wire 13 enters the holder 7 and is suitably insulated therefrom. This wire is secured within the holder to a spring contact 19 mounted on insulating block 20. A tube of insulation 21 secured to and projecting back from the head 8 into the holder 7, through which the wire solder 6 may also pass, engages the spring contact 19 when the head 8 is rocked about the pivot 9 and forces the contact 19 against the wall of the holder 7 and completes the circuit through the primary and secondary of the transformer. The head 8 is rocked by pressing the exposed end of the solder at the proposed joint between the pieces 1 and 2.

The closing of the circuit heats the work pieces 1, 2 and causes the solder to melt and flow in the joint. As the solder melts its mechanical resistance breaks down and the circuit is automatically broken due to the head 8 being rocked in the reverse direction by the spring 22.

As the solder 6 is used up more solder may be projected through the nozzle of the head 8 by rotating the feed rolls 10, 11.

The circuit wires 17 and 18 may, if desired, be both insulated from the holder 7 as shown in Fig. 3. In this modification the wires enter the holder and their ends are secured to a spring contact device 23 mounted on an insulating block 24 in the holder. The contacts 23 are bridged by a tongue 25 carried by the insulation tube 21 when the head 8 is rocked and the circuit is thus completed as in the previous case.

If desired the circuit may be controlled manually as indicated in Fig. 2. In this case the pivoted head is not necessary, the circuit being controlled by the thumb of the operator acting on push button 26 projecting through the wall of the holder 7. The operator pressing this button closes the circuit through the primary as in the previous case and upon release of the button, the spring 27 breaks the circuit. If desired spring contacts arranged as shown in Fig. 3 may be employed with the push button 26.

It will be understood that my invention is not limited to the details of construction or arrangement or combination of parts as shown and described except as may be specified in the appended claims.

What I claim as my invention is:

1. In an electric soldering device, a holder through which the solder passes and circuit closing means carried by said holder for controlling the flow of current through the parts to be united.

2. In an electric soldering device, the combination with a wire solder, a tubular holder through which the solder passes, circuit wires connected with said holder and means associated with said holder for closing the circuit through said wires.

3. In an electric soldering device, the combination with a wire solder, a tubular holder through which the solder passes, means carried by said holder for feeding the solder therethrough, circuit wires attached to said holder and a circuit controlling device carried by said holder for controlling the flow of current through said wires.

4. In an electric soldering device, a holder through which a wire solder passes, circuit wires attached to said holder, a relay in the circuit of said wires and means forming part of said holder and adapted to control the circuit through said relay.

5. In an electric soldering device, the combination with a solder, a tubular holder through which said solder passes, feed rolls for forcing the solder through the end of said holder, circuit wires connected to said holder, a relay in the circuit of said wires and a switch carried by said holder and adapted to close the circuit of said relay.

6. In an electric soldering device, the combination with the solder, of a holder through which the solder passes, a head pivoted thereto, circuit wires attached to said holder and means controlled by said head and adapted to automatically control the flow of current through said circuit wires.

7. In an electric soldering device, a tubular holder having a pivoted head, a wire solder passing through said holder and said head and an electric switch connected with said holder and adapted to be actuated by the movement of said head.

8. In an electric soldering device, the combination with a wire solder, a tubular holder through which the solder passes, circuit wires connected with said holder and circuit controlling means carried by said holder and adapted to be actuated by said wire solder.

9. In an electric soldering device, the combination with a wire solder, a tubular holder through which said solder passes, circuit wires attached to said holder, a circuit controller carried by said holder, a pivoted head for said holder adapted to actuate said circuit controller and means acting on said head to normally render said circuit controller inactive.

10. In an electric soldering device, the combination with a wire solder, of a holder through which the solder passes, circuit wires attached to the holder, a circuit controller carried by the holder and a pivoted head adapted to be actuated by the solder to close the circuit and to automatically break the circuit when the solder melts.

11. In an electric soldering device, the combination with a wire solder, of a tubular holder provided with a pivoted head through which the solder passes, circuit wires attached to the holder, a circuit controller carried by the holder and actuated by the pivoted head and a feed device for said solder secured to said pivoted head.

Signed at Southbridge, in the county of Worcester and State of Mass., this 25th day of September, A. D. 1918.

FREDERICK A. COSTELLO.

Witnesses:
  Rose A. Costello,
  H. K. Parsons.